Feb. 1, 1938.  A. G. M. MICHELL  2,106,984
IMPROVED NUT
Filed July 18, 1935

Anthony George Maldon Michell
By Marshall & Hawley
Attys.

Patented Feb. 1, 1938

2,106,984

UNITED STATES PATENT OFFICE 2,106,984

IMPROVED NUT

Anthony George Maldon Michell, Melbourne, Australia

Application July 18, 1935, Serial No. 31,961
In Great Britain June 12, 1935

7 Claims. (Cl. 85—32)

This invention relates to improvements in screwed nuts of the kind described and claimed in the present applicant's Patent No. 2,005,348, issued June 18, 1935, and consists in a method of construction whereby the nut is manufactured in two parts, which are by further operations assembled and connected together to form the complete nut.

Ordinary nuts tend to "slack back" or unscrew when subjected to varying loads or to severe vibration while under load.

As more fully explained in my Patent 2,005,348 above referred to, tension on a nut of the usual construction tends to cause the outer threaded portion to grip the bolt and the inner portion to separate from the nut. See Figs. 2, 4, 7 and 9 of said patent.

This invention has for its object to eliminate such tendencies by so forming and supporting the nut that the threaded portions which are subject to the stresses tending to elongate the nut are capable of elongation, axially, in a manner similar to the engaging part of the bolt. In other words, the nut is so formed and supported that the more heavily loaded portions thereof and particularly the threaded portions are in a condition of general axial tension and not under compression as when the nut is supported in the usual manner.

In the accompanying drawing Fig. 1 is an axial section of a nut constructed according to the invention, the nut being shown as screwed on a suitable bolt.

Figure 2:
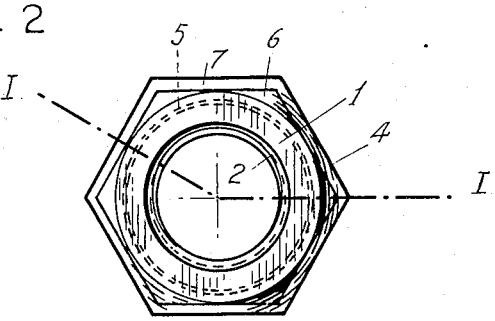
Figs. 2 and 3 are views of the upper and lower faces respectively, of the nut shown in section in Fig. 1.
Figure 1:
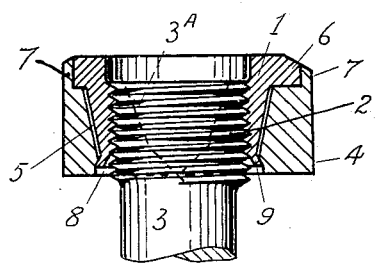

As shown in Figs. 1 and 2 (Fig. 1 being a section on the broken line I—I of Fig. 2), the nut consists of an inner part or core 1, on which is formed the thread 2 fitting the screwed portion of the bolt 3, and an outer part or shell 4 surrounding and suporting the core. The portion of the core 1 on which the thread 2 is formed has a conoidal outer surface larger in diameter at its upper end, (i. e. the end engaging with the end of the bolt), than at its other, or lower, end, where its diameter only slightly exceeds the diameter of the bolt 3. The shell 4 is formed with a corresponding conoidal hollow or recess, so that when the core 1 and shell 4 are assembled to form the complete nut as shown in the figures only a narrow interspace 5 remains between the two parts. The bolt 3 is preferably formed with a recess 3ᴀ in its end as indicated by dotted lines in Fig. 1.

In all these respects the nut and bolt conform to the prior patent above cited, and the nut which is the subject of the present invention is designed to secure all the advantages set out in that patent, as compared with ordinary nuts, with the added advantages of increased facility and economy of manufacture and increased strength of the completed nut.

According to the present invention the upper part of the core 1 is provided with a flange 6, and the upper part of the shell 4 is formed with a recess within a rim 7, to receive the periphery of this flange and to form a shoulder for supporting the flange 6. The lower face of the flange 6 rests evenly on the shoulder at the bottom of the recess in the shell, as shown in Fig. 1, and close contact is made between the outer periphery of the flange 6 and the inner periphery of the rim 7.

In the form of nut shown in Figs. 1 and 2 the flange 6 and the internal periphery of the rim 7 both have the form of hexagons, the rim 7 being thus a hollow hexagon of uniform thickness.

The saliences of the flange 6 at the angles of the hexagon, being thus fitted within the corresponding niches of the recess in the shell, ensure that the core 1 shall turn with the shell 4 about their common axis when the nut is screwed on the bolt by a spanner engaging, in the usual way, the external hexagonal faces of the shell.

Instead of being hexagonal the shell 4 and flange 6 may be square, or of other shape usual in nuts.

At the lower end of the shell 4 is formed a small annular recess 8, slightly larger in diameter than the lower end of the conoidal part of the core 1, and into this recess the thin lower edge 9 of the conoidal part of the core is expanded against a shoulder 11 formed between the conoidal recess of the rim 4 and its annular recess 8, as shown in Fig. 1.

By this means, together with the fitting of the flange 6 of the core within the rim 7 of the shell, the core and shell are permanently conected together to form the complete nut.

It will however be understood that, while the expanding of the edge 9 into the recess 8 prevents the detachment of the two parts of the nut during handling or use, it does not prevent the core from extending axially under the tension of the bolt, the caulked edge 9 being capable of being displaced slightly downwards, but not upwards, with respect to the shell.

Figure 4:
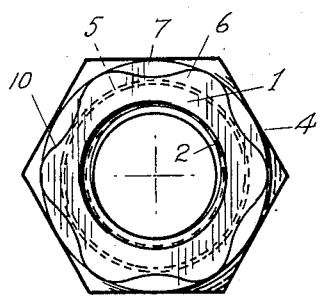
Figs. 4 and 5 are views, corresponding with Fig. 2, of alternative forms of the upper portion of the nut.
Figure 5:
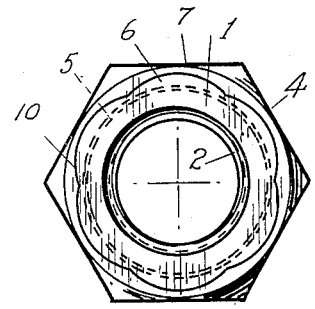

In the alternative forms of the nut shown in Figs. 4 and 5, the flange 6 is of curvilinear outline and fits a corresponding curvilinear recess in the rim 7 of the nut along the curved polygonal line of contact, 10. These forms have the advantage, as compared with the hexagonal form shown in Fig. 2, that the recess in the rim 7 is more easily formed by machining processes. This is especially the case if, as shown in Fig. 5, the saliences of the line 10 consist of circular arcs whereby the recess in the rim can be formed by successive applications of a cylindrical cutter. The shell shown in these figures, as well as that shown in Fig. 2 may however be formed by forging, or stamping, without any cutting, or similar machining, operations.

Figure 3:
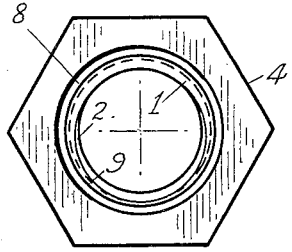

It is to be understood that the nuts shown in Figs. 4 and 5 are similar to that described above in connection with Figs. 1 and 2 in all respects other than the form of the polygonal line 10, and Fig. 3 is to be understood as representing the lower faces of nuts conforming to all of these figures.

What I claim is:

1. A nut comprising a core having a circumferentially continuous internally threaded conoidal portion and an integral flange at the larger end of said portion, said flange being formed with circumferential saliences, a separately formed shell surrounding the core, circumferentially spaced from its conoidal portion and constructed with a recess having a shoulder for supporting said flange and having niches corresponding with said saliences, and a rim at the smaller end of the conoidal portion adapted to engage the shell.

2. A nut comprising a core having a circumferentially continuous internally threaded conoidal portion and an integral flange at the larger end of said portion, said flange being formed with circumferential saliences, a separately formed shell surrounding the core, circumferentially spaced from its conoidal portion and constructed with a recess having niches corresponding with said saliences, the base of said recess forming a seat for supporting the flange of the core, and a rim at the smaller end of the conoidal portion adapted to engage the shell.

3. A nut comprising a core having a circumferentially continuous internally threaded conoidal portion and an integral flange at the larger end of said portion, said flange being formed with circumferential saliences, a separately formed shell surrounding the core, circumferentially spaced from its conoidal portion and constructed with a recess having niches corresponding with said saliences, the base of said recess forming a seat for supporting the flange of the core, a recess at the lower end of the shell forming a shoulder, and said core being permanently attached to the shell by having its lower end expanded into the latter recess under said shoulder.

4. A nut comprising an internally threaded longitudinally expansible threaded core, a separately formed shell, said core and shell being interconnected at one end against relative longitudinal movement by a non-rotative connection and being circumferentially separated from each other below said connection.

5. A nut comprising a core having an integral flange at one of its ends and a longitudinally expansible internally threaded conoidal portion, combined with a separately formed shell interconnected with said flange and surrounding but circumferentially spaced from the conoidal portion of the core.

6. A nut comprising an internally threaded core fitted within a separately formed coaxial shell and circumferentially spaced therefrom, said core having a flange near one of its ends recessed in said shell for the purposes set forth.

7. A nut comprising an internally threaded core fitted within a separately formed shell surrounding said core and circumferentially spaced therefrom, said core being supported on said shell by a flange near one of its ends having circumferentially saliences fitting within corresponding niches in said shell.

ANTHONY GEORGE MALDON MICHELL.